(12) United States Patent
Gao et al.

(10) Patent No.: US 10,613,318 B2
(45) Date of Patent: Apr. 7, 2020

(54) BI-DIRECTIONAL EXCITATION COLOR WHEEL AND LIGHT SOURCE SYSTEM THEREOF

(71) Applicant: IVIEW DISPLAYS (SHENZHEN) COMPANY LTD., Shenzhen (CN)

(72) Inventors: Zhiqiang Gao, Hongkong (CN); Steve Yeung, Hongkong (CN); Augustus Yeung, Shenzhen (CN); Manying Ning, Shenzhen (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 0 days.

(21) Appl. No.: 16/206,442

(22) Filed: Nov. 30, 2018

(65) Prior Publication Data
US 2019/0094523 A1   Mar. 28, 2019

Related U.S. Application Data

(63) Continuation of application No. PCT/CN2017/075610, filed on Mar. 3, 2017.

(30) Foreign Application Priority Data

Nov. 28, 2016  (CN) .......................... 2016 1 1061681

(51) Int. Cl.
*G02B 26/00* (2006.01)
*H04N 9/31* (2006.01)
(Continued)

(52) U.S. Cl.
CPC .......... *G02B 26/008* (2013.01); *G03B 21/204* (2013.01); *G03B 33/08* (2013.01); *H04N 9/3114* (2013.01); *G03B 21/2066* (2013.01)

(58) Field of Classification Search
CPC .... G02B 26/008; G03B 21/204; G03B 33/08; G03B 21/2066; H04N 9/3114
(Continued)

(56) References Cited

U.S. PATENT DOCUMENTS

| | | | |
|---|---|---|---|
| 9,341,332 B2 * | 5/2016 | Choi | ................. G03B 21/2013 |
| 2014/0118991 A1 | 5/2014 | Lin et al. | |
| 2014/0253882 A1 | 9/2014 | King et al. | |

FOREIGN PATENT DOCUMENTS

| | | |
|---|---|---|
| CN | 102566230 A | 7/2012 |
| CN | 102645825 A | 8/2012 |

(Continued)

OTHER PUBLICATIONS

International Search Report dated Aug. 16, 2017; PCT/CN2017/075610.

*Primary Examiner* — Anh T Mai
*Assistant Examiner* — Hana S Featherly
(74) *Attorney, Agent, or Firm* — IPro, PLLC; Na Xu

(57) ABSTRACT

A bi-directional excitation color wheel includes a first working surface and a second working surface which are of the same size, wherein the first working surface includes a first working ring and a second working ring which are concentric rings; the second working surface includes a third working ring and a fourth working ring which are concentric rings; the first working ring includes a first translucent region and a green fluorescent region, the second working ring includes a second translucent region, the third working ring includes a third translucent region, and the fourth working ring includes a fourth translucent region and a first fluorescent region; the first translucent region and the third translucent region are the same translucent region, and the second translucent region and the fourth translucent region are the same translucent region.

16 Claims, 3 Drawing Sheets

(51) Int. Cl.
*G03B 21/20* (2006.01)
*G03B 33/08* (2006.01)
(58) Field of Classification Search
USPC .......................................................... 362/84
See application file for complete search history.

(56) References Cited

FOREIGN PATENT DOCUMENTS

| | | | |
|---|---|---|---|
| CN | 104252094 | A | 12/2014 |
| CN | 104267569 | A | 1/2015 |
| CN | 204302653 | U | 4/2015 |
| CN | 104808273 | A | 7/2015 |
| CN | 105222001 | A | 1/2016 |
| CN | 105353578 | A | 2/2016 |
| CN | 105425521 | A | 3/2016 |
| CN | 105659160 | A | 6/2016 |
| CN | 205539893 | U | 8/2016 |
| CN | 205608228 | U | 9/2016 |
| CN | 106371278 | A | 2/2017 |
| WO | 2013063902 | A1 | 5/2013 |

* cited by examiner

600A

600B

BI-DIRECTIONAL EXCITATION COLOR WHEEL AND LIGHT SOURCE SYSTEM THEREOF

This disclosure is a continuation of International Patent Application No. PCT/CN2017/075610, filed on Mar. 3, 2017, which is based upon and claims priority to Chinese Patent Application No. 201611061681.8, filed on Nov. 28, 2016, the entire contents of which are incorporated herein by reference.

TECHNICAL FIELD

The present disclosure relates to a color wheel, and in particular, relates to a bi-directional excitation color wheel and a light source system thereof.

BACKGROUND

A light source of a projector is generally a system that can generate three primary colors of red, green and blue lights. However, for the luminous efficiency of a solid-state light-emitting element, a blue solid-state light-emitting element generally has the best luminous efficiency. therefore, most of the current light sources are to excite light of various colors by adopting a blue solid-state light-emitting element cooperating with a fluorescent color wheel, instead of a method of directly emitting a red light by a red solid-state light-emitting element or emitting a green light by a green solid-state light-emitting element, thereby improving the luminous efficiency of a light source system. However, in order to improve the saturation of the light source, a corresponding filter is generally used for filtering.

In the color wheel used in the existing light source system, in order to obtain efficient red light, a double color wheel structure is adopted mostly, that is, two driving devices drive a fluorescent wheel and a filter wheel respectively. As a result, the structure is complicated and the cost is high. However, when a single color wheel is used, high-efficiency three primary color output cannot be implemented, and thus we design this solution.

SUMMARY

An embodiment of the present disclosure provides a bi-directional excitation color wheel, including: a first working surface, including a first working ring and a second working ring which are concentric rings, the first working ring including a first translucent region and a green fluorescent region, the second working ring including a second translucent region; and a second working surface, which is of the same size with the first working surface, including a third working ring and a fourth working ring which are concentric rings, the third working ring including a third translucent region, the fourth working ring including a fourth translucent region and a first fluorescent region; wherein, the angle of the third translucent region is equal to the sum of the angles of the fourth translucent region and the first fluorescent region, and the fourth translucent region and the first fluorescent region are continuously distributed; the angle extension lines, which pass through the center of a circle, of the ring where the fourth translucent region and the first fluorescent region are located fall within the third translucent region; the first translucent region and the third translucent region are the same translucent region, and the second translucent region and the fourth translucent region are the same translucent region.

Another embodiment of the present disclosure provides a laser light source system, including: a light source excitation unit that generates a blue laser, a reflecting mirror group, a dichroic filter group and the bi-directional excitation color wheel provided above, wherein, the reflecting mirror group includes a first reflecting mirror, a second reflecting mirror and a third reflecting mirror which reflect lights of all colors; the dichroic filter group includes a first dichroic filter, a second dichroic filter, a third dichroic filter and a fourth dichroic filter; wherein, the first dichroic filter transmits a blue light from the light source excitation unit and reflects a green light from the bi-directional excitation color wheel; the second dichroic filter reflects the blue light which is emitted from the light source excitation unit, transmitted through the first dichroic filter and the bi-directional excitation color wheel, reflected by the first reflecting mirror and the second reflecting mirror and finally transmitted through the bi-directional excitation color wheel, and the second dichroic filter also transmits the green light reflected by the first dichroic filter; and the fourth dichroic filter reflects a red light and transmit a blue light and a green light; the first reflecting mirror, the second reflecting mirror, the second dichroic filter and the first dichroic filter are distributed in a rectangular shape; the bi-directional excitation color wheel is positioned between the side on which the first reflecting mirror and the second reflecting mirror are located and the side on which the first dichroic filter and the second dichroic filter are located; the third dichroic filter is on the side on which the second reflecting mirror and the second dichroic filter are located, and the third dichroic filter is located between the second reflecting mirror and the bi-directional excitation color wheel, for transmitting the blue light reflected by the second reflecting mirror and reflecting light reflected from the bi-directional excitation color wheel, the light reflected by the third dichroic filter is then reflected by the third reflecting mirror to the fourth dichroic filter for reflection, and the fourth dichroic filter also transmits a light from the second dichroic filter.

DETAILED DESCRIPTION

Embodiment 1

Figure 1:
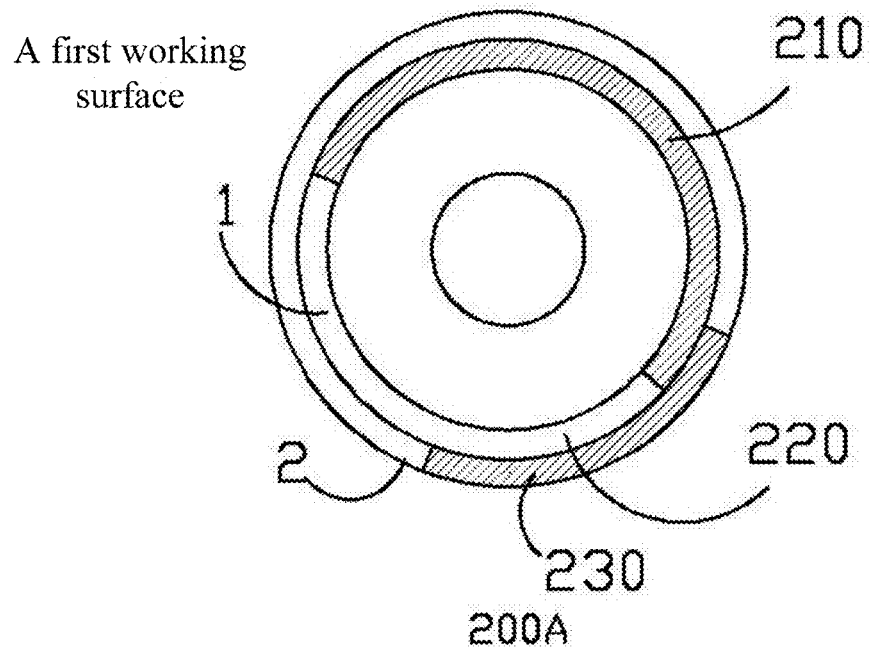
FIG. 1 is a front view of a first working surface of a bi-directional excitation color wheel according to Embodiment 1 of the present disclosure.

FIG. 1 is a front view of a first working surface of a bi-directional excitation color wheel according to this embodiment. The first working surface 200A includes a first working ring 1 and a second working ring 2, and the first working ring 1 is located on the inner side of the second working ring 2, and the first working ring 1 and the second working ring 2 are concentric rings. The first working ring 1 includes a first translucent region 210 and a green fluorescent region 220; and the second working ring 2 includes a second translucent region 230.

Figure 2:
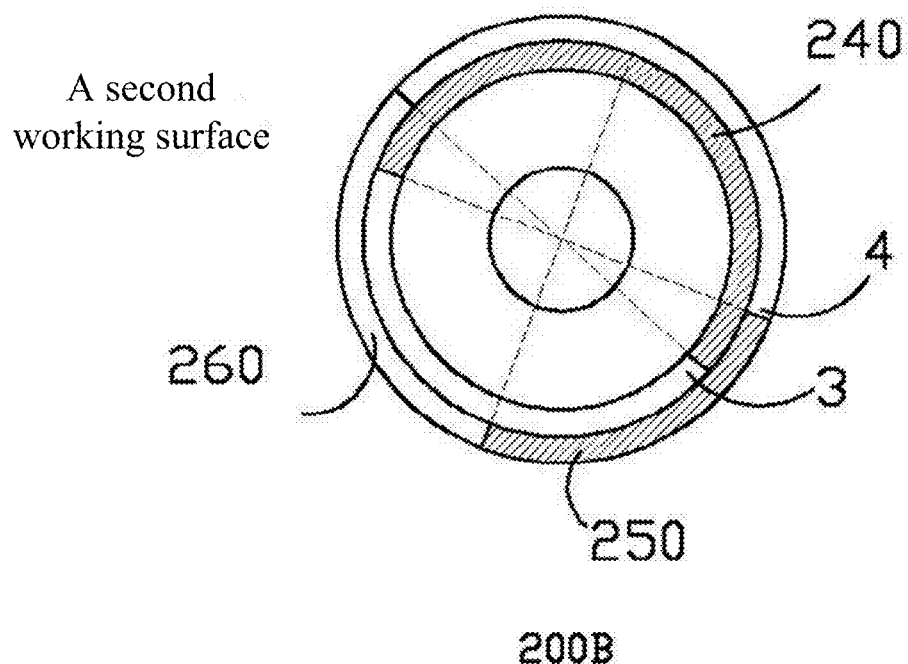
FIG. 2 is a front view of a second working surface of the bi-directional excitation color wheel according to Embodiment 1 of the present disclosure.

FIG. 2 is a front view of a second working surface of the bi-directional excitation color wheel according to this embodiment. The second working surface 200B has the same size as the first working surface 200A and includes a third working ring 3 and a fourth working ring 4, the third working ring 3 is located on the inner side of the fourth working ring 4, and the third working ring 3 and the fourth working ring 4 are concentric rings. The third working ring 3 includes a third translucent region 240, and the fourth working ring 4 includes a fourth translucent region 250 and a first fluorescent region 260.

Wherein, the first translucent region 210 and the third translucent region 240 are the same translucent region, the second translucent region 230 and the fourth translucent region 250 are the same translucent region, and the angle of the third translucent region 240 is equal to the sum of the angles of the fourth translucent region 250 and the first fluorescent region 260. Meanwhile, the fourth translucent region 250 and the first fluorescent region 260 are continuously distributed. The angle extension lines, which pass through the center of a circle, of the ring where the fourth translucent region 250 and the first fluorescent region 260 are located fall within the third translucent region 240.

Wherein, the first fluorescent region 260 can be coated with yellow fluorescent powder or red fluorescent powder.

Embodiment 2

Figure 3:
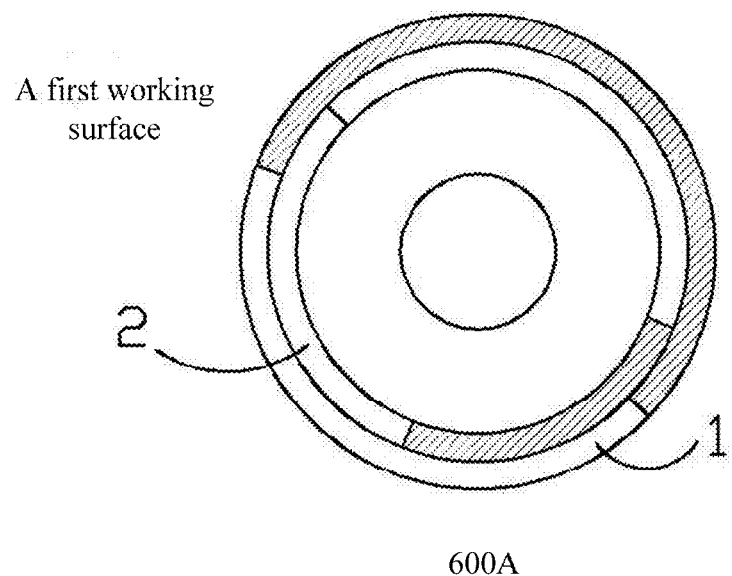
FIG. 3 is a front view of a first working surface of a bi-directional excitation color wheel according to Embodiment 2 of the present disclosure.

FIG. 3 is a front view of a first working surface of a bi-directional excitation color wheel according to this embodiment, wherein, the difference from the first working surface 200A of Embodiment 1 is that in the first working surface 600A of this embodiment, the first working ring 1 is located on the outer side of the second working ring 2.

Figure 4:
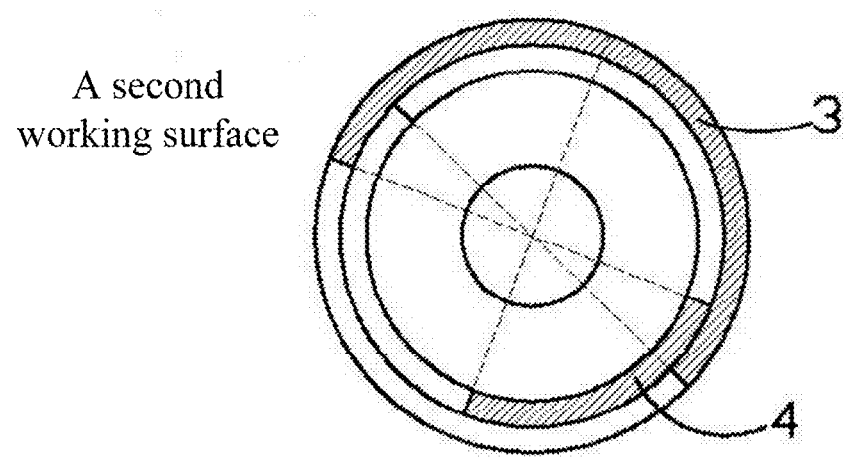
FIG. 4 is a front view of a second working surface of the bi-directional excitation color wheel according to Embodiment 2 of the present disclosure.

FIG. 4 is a front view of a second working surface of the bi-directional excitation color wheel according to this embodiment, wherein, the difference from the second working surface 200B of Embodiment 1 is that in the second working surface 600B of this embodiment, the third working ring 3 is located on the outer side of the fourth working ring 4.

Embodiment 3

Figure 5:
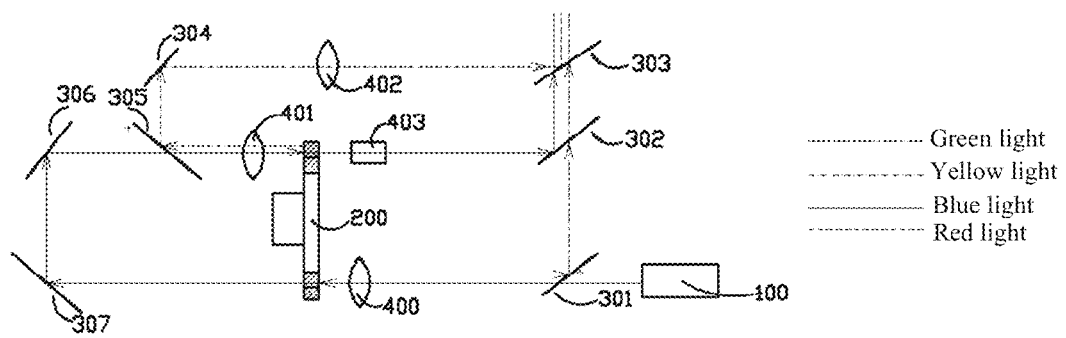
FIG. 5 is a schematic structural view of a laser light source system according to Embodiment 3 of the present disclosure.

FIG. 5 is a schematic structural view of a laser light source system according to this embodiment. The laser light source system includes a light source excitation unit 100 that generates a blue laser, a reflecting mirror group, a dichroic filter group, a relay lens group, a bi-directional excitation color wheel 200 and a collimating lens 403.

Wherein, the reflecting mirror group can reflect lights of all colors, and includes a first reflecting mirror 307, a second reflecting mirror 306 and a third reflecting mirror 304.

The dichroic filter group includes a first dichroic filter 301, a second dichroic filter 302, a third dichroic filter 305 and a fourth dichroic filter 303; wherein, the first dichroic filter 301 reflects a green light and transmits a blue light, the second dichroic filter 302 reflects a blue light and transmits a green light, the third dichroic filter 305 reflects a red light and transmits a blue light, and the fourth dichroic filter 303 reflects a red light and transmits a blue light and a green light.

The relay lens group includes a first relay lens 400, a second relay lens 401 and a third relay lens 402.

The first reflecting mirror 307, the second reflecting mirror 306, the second dichroic filter 302 and the first dichroic filter 301 are distributed in a rectangular shape, and the bi-directional excitation color wheel 200 is positioned between the side on which the first reflecting mirror 307 and the second reflecting mirror 306 are located and the side on which the first dichroic filter 301 and the second dichroic filter 302 are located. The collimating lens 403 is positioned between the bi-directional excitation color wheel 200 and the second dichroic filter 302. The first relay lens 400 is positioned between the bi-directional excitation color wheel 200 and the first dichroic filter 301. The third dichroic filter 305 is located on the side on which the second reflecting mirror 306 and the second dichroic filter 302 are located, and the third dichroic filter 305 is located between the second reflecting mirror 306 and the bi-directional excitation color wheel 200. The second relay lens 401 is arranged between the bi-directional excitation color wheel 200 and the third dichroic filter 305. The third reflecting mirror 304 is positioned in front of a reflective light path of the third dichroic filter 305. The fourth dichroic filter 303 is positioned in front of a transmission light path of the second dichroic filter 302. The third relay lens 402 is arranged between the third reflecting mirror 304 and the fourth dichroic filter 303.

Wherein, the light source excitation unit 100 is positioned behind a transmission light path of the first dichroic filter 301.

In this embodiment, the first fluorescent region 260 in the fourth working ring 4 of the second working surface of the bi-directional excitation color wheel is required to be a fluorescent region coated with red fluorescent powder.

The light source excitation unit 100 emits a blue laser, and the blue laser is transmitted through the first dichroic filter 301 and the first relay lens 400 to reach the first working ring 1 of the first working surface of the bi-directional excitation color wheel 200. When the blue light gets to the green fluorescent region 220 of the first working ring 1, a green light is generated and reflected to the first dichroic filter 301, then, the green light is again reflected by the first dichroic filter 301 to the second dichroic filter 302, and transmitted through the second dichroic filter 302 and the fourth dichroic filter 303 to be output out of the laser light source system. When the blue light gets to the first translucent region 210 of the first working ring 1, the transmitted blue light is reflected by the first reflecting mirror 307 and the second reflecting mirror 306 to reach the third dichroic filter 305, and then, the blue light is transmitted through the third dichroic filter 305 and the second relay lens 401 to reach the fourth working ring 4 of the second working surface of the bi-directional excitation color wheel 200; when the blue light gets to the first fluorescent region 260 of the fourth working ring 4 (in this embodiment, the fluorescent region is coated with red fluorescent powder), a red light is generated and reflected by the third dichroic filter 305 (in this embodiment, the third dichroic filter reflects a red light and transmits a blue light) and the third reflecting mirror 304, and then transmitted through the third relay lens 402 to reach the fourth dichroic filter 303, and finally reflected out of the light source system by the fourth dichroic filter 303; when the blue light gets to the fourth translucent region 250 of the fourth working ring 4, the transmitted blue light reaches the second dichroic filter 302 through the collimator lens 403, and then, the blue light is reflected to the fourth dichroic filter 303 by the second dichroic filter 302, and finally transmitted out of the light source system through the fourth dichroic filter 303. Thereby, the green, red and blue lights of the light source system are sequentially output.

Embodiment 4

Figure 6:
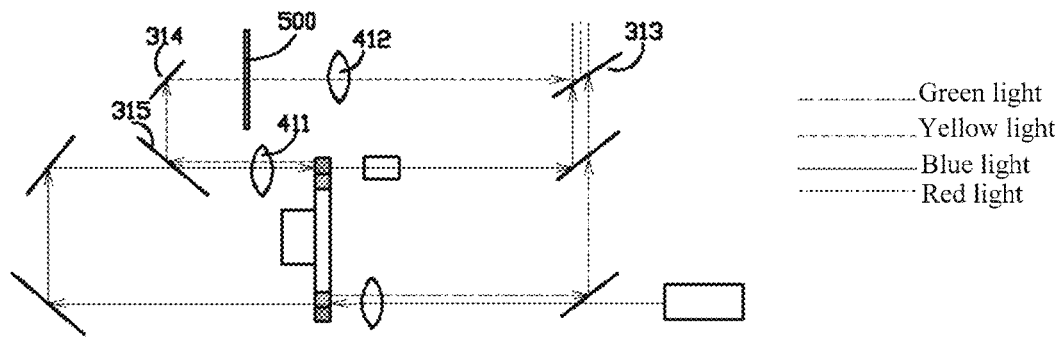
FIG. 6 is a schematic structural view of a laser light source system according to Embodiment 4 of the present disclosure.

FIG. 6 is a schematic structural view of a laser light source system according to this embodiment. The difference from the structure of Embodiment 3 is that in this embodiment, the third dichroic filter 315 reflects a yellow light and transmits a blue light, and a red light filter 500 is positioned between the third reflecting mirror 314 and the third relay lens 412 to generate a red light by filtration.

In this embodiment, the first fluorescent region 260 in the fourth working ring 4 of the second working surface of the bi-directional excitation color wheel is required to be a fluorescent region coated with yellow fluorescent powder.

The difference from the light paths in Embodiment 3 is the manner in which a red light is generated.

When the blue light gets to the first fluorescent region 260 of the fourth working ring 4 of the second working surface of the bi-directional excitation color wheel (in this embodiment, the fluorescent region is coated with yellow fluorescent powder), a yellow light is generated and reflected by the third dichroic filter 315 (in this embodiment, the third dichroic filter reflects a yellow light and transmits a blue light) and the third reflecting mirror 314 to reach the red light filter 500, thus, a red light is generated by filtration, and the red light is transmitted through the third relay lens 412 to reach the fourth dichroic filter 313 and finally reflected out of the light source system by the fourth dichroic filter 313.

All of the translucent regions described above may be through holes or transparent glass coated with an anti-reflection film, and in the present disclosure, the position of the light source excitation unit may be adjusted according to actual working conditions, and the transmission of light is implemented by increasing or decreasing the reflecting mirrors.

The present disclosure has the beneficial effects that by means of using the present bi-directional excitation color wheel to implement a dual-color-wheel, dual-driving light source outputting three primary colors, structure can be simplified.

What is claimed is:

1. A bi-directional excitation color wheel, comprising:
   a first working surface, comprising a first working ring and a second working ring which are concentric rings, the first working ring comprising a first translucent region and a green fluorescent region, the second working ring comprising a second translucent region; and
   a second working surface, which is of the same size with the first working surface, comprising a third working ring and a fourth working ring which are concentric rings, the third working ring comprising a third translucent region, the fourth working ring comprising a fourth translucent region and a first fluorescent region; wherein, the angle of the third translucent region is equal to the sum of the angles of the fourth translucent region and the first fluorescent region, and the fourth translucent region and the first fluorescent region are continuously distributed; the angle extension lines, which pass through the center of a circle, of the ring where the fourth translucent region and the first fluorescent region are located fall within the third translucent region; the first translucent region and the third translucent region are the same translucent region, and the second translucent region and the fourth translucent region are the same translucent region.

2. The bi-directional excitation color wheel according to claim 1, wherein the first working ring of the first working surface is located on the inner side of the second working ring, and the third working ring of the second working surface is located on the inner side of the fourth working ring.

3. The bi-directional excitation color wheel according to claim 2, wherein the first fluorescent region is a red fluorescent region.

4. The bi-directional excitation color wheel according to claim 2, wherein the first fluorescent region is a yellow fluorescent region.

5. The bi-directional excitation color wheel according to claim 1, wherein the first working ring of the first working surface is located on the outer side of the second working ring, and the third working ring of the second working surface is located on the outer side of the fourth working ring.

6. The bi-directional excitation color wheel according to claim 5, wherein the first fluorescent region is a red fluorescent region.

7. The bi-directional excitation color wheel according to claim 5, wherein the first fluorescent region is a yellow fluorescent region.

8. The bi-directional excitation color wheel according to claim 1, wherein the first fluorescent region is a red fluorescent region.

9. The bi-directional excitation color wheel according to claim 1, wherein the first fluorescent region is a yellow fluorescent region.

10. A laser light source system, comprising: a light source excitation unit that generates a blue laser, a reflecting mirror group, a dichroic filter group and a bi-directional excitation color wheel; wherein,
    the reflecting mirror group comprises a first reflecting mirror, a second reflecting mirror and a third reflecting mirror which reflect lights of all colors;
    the dichroic filter group comprises a first dichroic filter, a second dichroic filter, a third dichroic filter and a fourth dichroic filter; wherein, the first dichroic filter transmits a blue light from the light source excitation unit and reflects a green light from the bi-directional excitation color wheel; the second dichroic filter reflects the blue light which is emitted from the light source excitation unit, transmitted through the first dichroic filter and the bi-directional excitation color wheel, reflected by the first reflecting mirror and the second reflecting mirror and finally transmitted through the bi-directional excitation color wheel, and the second dichroic filter also transmits the green light reflected by the first dichroic filter; and the fourth dichroic filter reflects a red light and transmit a blue light and a green light;
    the bi-directional excitation color wheel comprises a first working surface, comprising a first working ring and a second working ring which are concentric rings, the first working ring comprising a first translucent region and a green fluorescent region, the second working ring comprising a second translucent region; and a second working surface, which is of the same size with the first working surface, comprising a third working ring and a fourth working ring which are concentric rings, the third working ring comprising a third translucent region, the fourth working ring comprising a fourth translucent region and a first fluorescent region; wherein, the angle of the third translucent region is equal to the sum of the angles of the fourth translucent region and the first fluorescent region, and the fourth translucent region and the first fluorescent region are continuously distributed; the angle extension lines, which pass through the center of a circle, of the ring where the fourth translucent region and the first fluorescent region are located fall within the third translucent region; the first translucent region and the third translucent region are the same translucent region, and the second translucent region and the fourth translucent region are the same translucent region;

the first reflecting mirror, the second reflecting mirror, the second dichroic filter and the first dichroic filter are distributed in a rectangular shape; the bi-directional excitation color wheel is positioned between the side on which the first reflecting mirror and the second reflecting mirror are located and the side on which the first dichroic filter and the second dichroic filter are located; the third dichroic filter is on the side on which the second reflecting mirror and the second dichroic filter are located, and the third dichroic filter is located between the second reflecting mirror and the bi-directional excitation color wheel, for transmitting the blue light reflected by the second reflecting mirror and reflecting light reflected from the bi-directional excitation color wheel, the light reflected by the third dichroic filter is then reflected by the third reflecting mirror to the fourth dichroic filter for reflection, and the fourth dichroic filter also transmits a light from the second dichroic filter.

11. The laser light source system according to claim 10, further comprising a collimating lenses and a relay lens group; wherein the relay lens group comprises a first relay lens, a second relay lens and a third relay lens, wherein the first relay lens is located between the first dichroic filter and the bi-directional excitation color wheel, the second relay lens is located between the third dichroic filter and the bi-directional excitation color wheel, and the third relay lens is located between the third reflecting mirror and the fourth dichroic filter;

the collimating lens is positioned between the bi-directional excitation color wheel and the second dichroic filter.

12. The laser light source system according to claim 10, wherein the third dichroic filter is a dichroic filter that reflects a red light and transmits a blue light.

13. The laser light source system according to claim 12, further comprising a collimating lenses and a relay lens group; wherein the relay lens group comprises a first relay lens, a second relay lens and a third relay lens, wherein the first relay lens is located between the first dichroic filter and the bi-directional excitation color wheel, the second relay lens is located between the third dichroic filter and the bi-directional excitation color wheel, and the third relay lens is located between the third reflecting mirror and the fourth dichroic filter;

the collimating lens is positioned between the bi-directional excitation color wheel and the second dichroic filter.

14. The laser light source system according to claim 10, wherein the third dichroic filter is a dichroic filter that reflects a yellow light and transmits a blue light.

15. The laser light source system according to claim 14, further comprising a collimating lenses and a relay lens group; wherein the relay lens group comprises a first relay lens, a second relay lens and a third relay lens, wherein the first relay lens is located between the first dichroic filter and the bi-directional excitation color wheel, the second relay lens is located between the third dichroic filter and the bi-directional excitation color wheel, and the third relay lens is located between the third reflecting mirror and the fourth dichroic filter;

the collimating lens is positioned between the bi-directional excitation color wheel and the second dichroic filter.

16. The laser light source system according to claim 15, wherein a red light filter is positioned between the third reflecting mirror and the third relay lens.

* * * * *